May 19, 1936.  L. L. CUNNINGHAM  2,041,050
ADJUSTABLE DIFFERENTIAL CONTROL MECHANISM
Filed Nov. 10, 1934    4 Sheets-Sheet 1
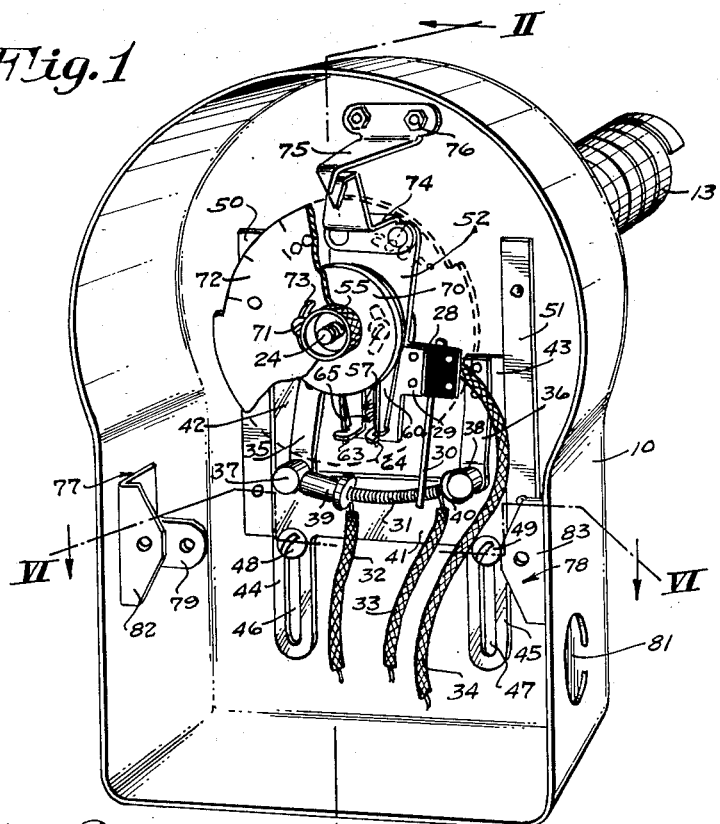
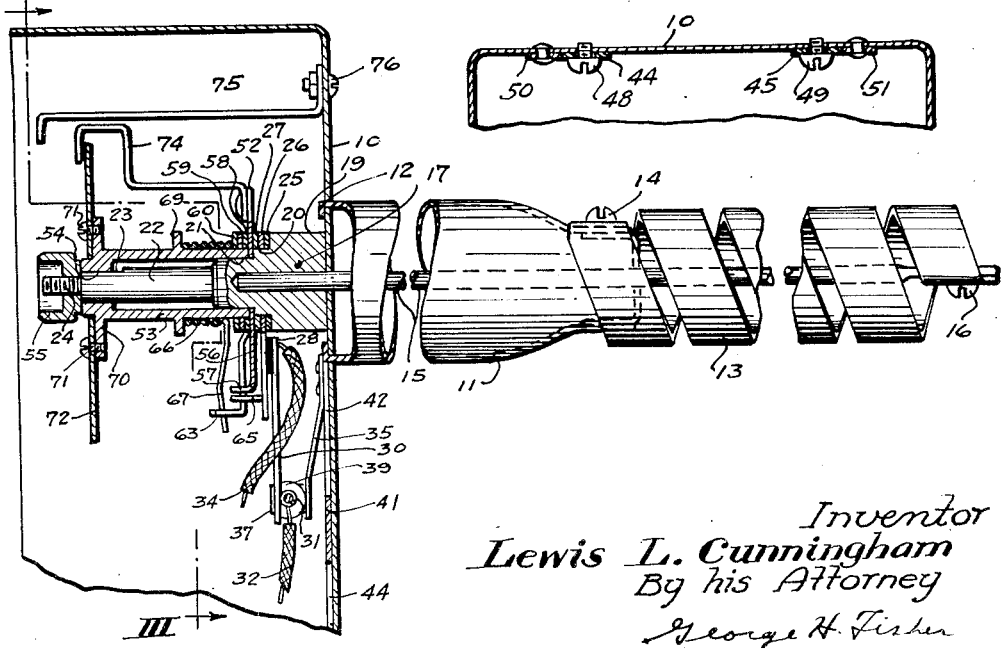
Inventor
Lewis L. Cunningham
By his Attorney
George H. Fisher May 19, 1936.  L. L. CUNNINGHAM  2,041,050
ADJUSTABLE DIFFERENTIAL CONTROL MECHANISM
Filed Nov. 10, 1934  4 Sheets-Sheet 2
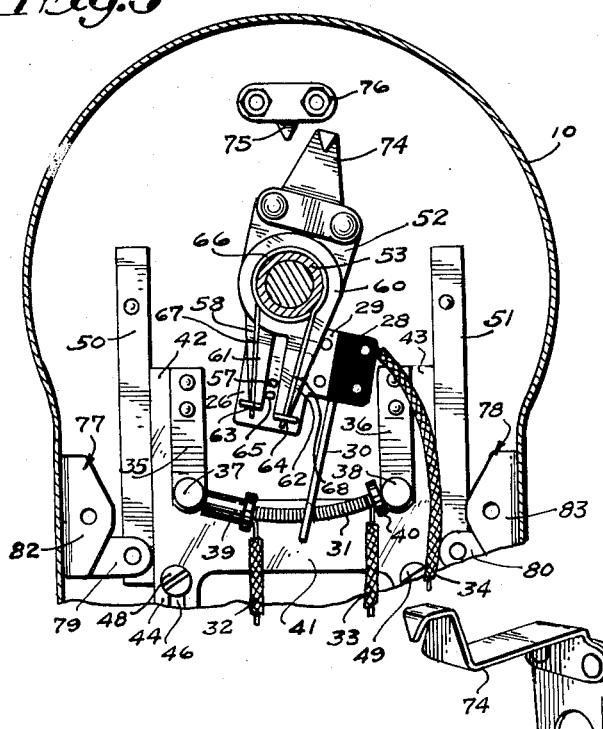
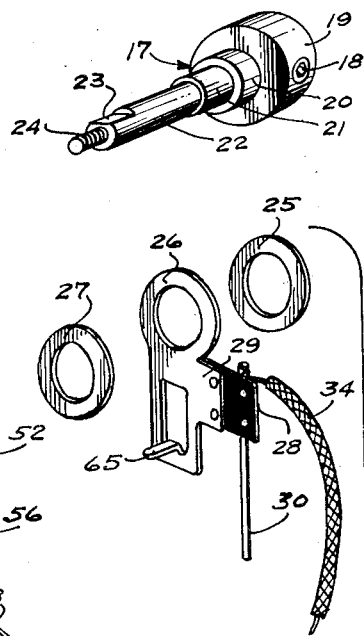
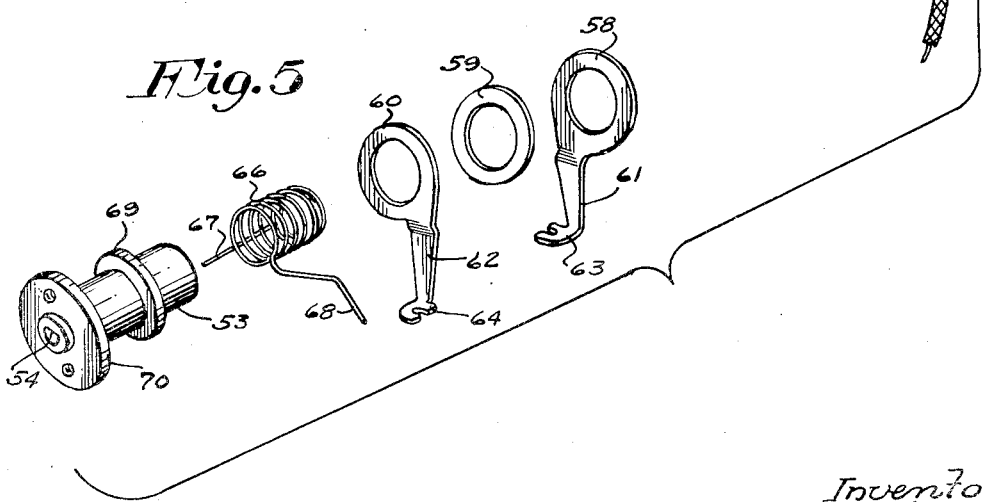
Inventor
Lewis L. Cunningham
By his Attorney

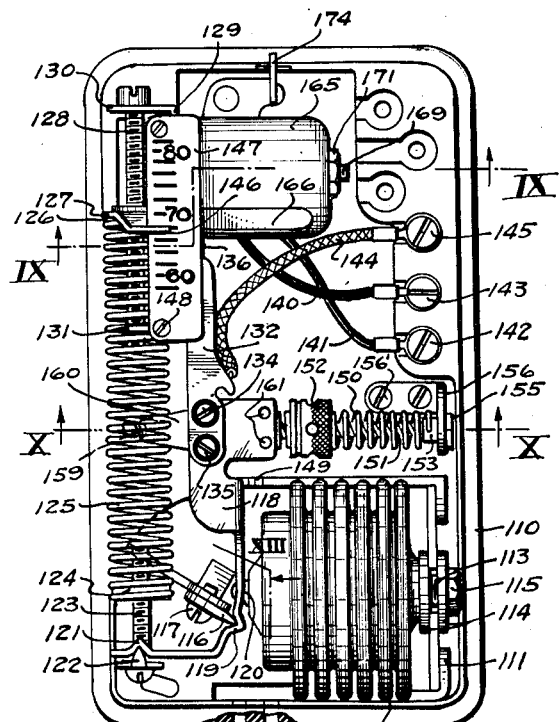

May 19, 1936. L. L. CUNNINGHAM 2,041,050
ADJUSTABLE DIFFERENTIAL CONTROL MECHANISM
Filed Nov. 10, 1934 4 Sheets-Sheet 4
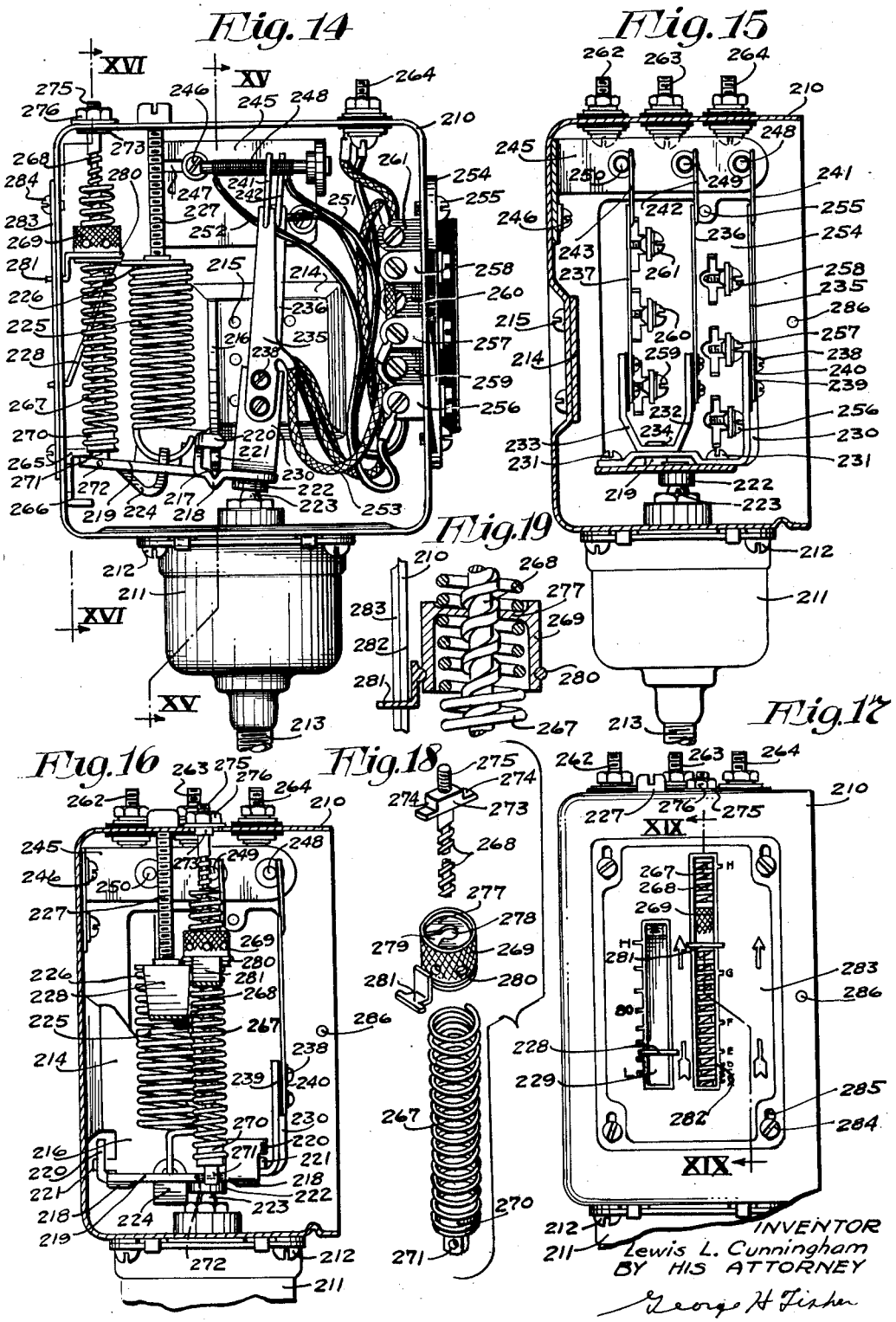

Patented May 19, 1936

2,041,050

UNITED STATES PATENT OFFICE

2,041,050

ADJUSTABLE DIFFERENTIAL CONTROL MECHANISM

Lewis L. Cunningham, Minneapolis, Minn., assignor to Minneapolis-Honeywell Regulator Company, Minneapolis, Minn., a corporation of Delaware Application November 10, 1934, Serial No. 752,481

30 Claims.  (Cl. 201—48)

This invention relates to an adjustable differential control mechanism of general utility that is responsive to a differential or range of changes in a condition such as pressure or temperature affecting the mechanism to operate an element such as a valve, a make and break switch, or a resistance. For purposes of illustration and description and not for limitation the invention is shown as applied to a variable resistance, preferably in the form of a potentiometer.

An object of this invention is to provide a novel control mechanism which is responsive to changes in a condition affecting the control mechanism to control an element progressively and gradually.

A further object is to provide a control mechanism which is responsive to changes in a condition affecting the control mechanism to control an element progressively and gradually a given amount according to a predetermined range of changes in the condition wherein the range of changes in the condition may be increased or decreased to control the element said given amount.

A still further object is to provide a control mechanism which is responsive to changes in a condition affecting the control mechanism to control an element progresively and gradually a given amount according to a predetermined range of changes in the condition wherein the changes in the condition may be raised or lowered and wherein the range of changes in the condition may be increased or decreased to control the element said given amount.

Another object is to provide a variable electrical resistance and an adjustable differential control mechanism therefor which gradually and progressively varies the resistance according to changes in a condition such as temperature or pressure affecting the control mechanism with means for determining the condition such as pressure or temperature required to vary the resistance, and means for determining the range of pressure or temperature required to vary the resistance a given amount.

Another object is to provide an adjustment in temperature or pressure responsive differential control mechanism wherein the range of pressure or temperature effective on the mechanism may be varied to keep the mid-point of the range constant and vary the upper and lower limits, to keep the lower limit constant and vary the upper limit, or to keep the upper limit constant and vary the lower limit.

More specifically, an object of one form of the invention is to provide an adjustment in an adjustable differential control mechanism for a variable electrical resistance wherein changes in a condition are reflected by the movement of a pivoted slider and wherein the distance between the pivot of the slider and the electrical resistance may be varied so that greater or lesser changes in the condition may be required to move the slider over the electrical resistance.

Again specifically, an object of another form of the invention is to provide an adjustment in an adjustable differential control mechanism wherein a range adjusting spring assembly creates an adjustable mechanical resistance at predetermined times to the changes in a condition effective on the control mechanism whereby the range of changes in the condition may be increased to complete the control action.

Another object is to provide a condition responsive element which is exceedingly accurate but delicate and subject to distortions for operating a control mechanism with a resilient driving mechanism between the condition responsive element and the control mechanism to prevent straining of and distortions in the condition responsive element.

A further object is to provide visual indications of the conditions that are operable to affect the control mechanism.

Further objects will be apparent from the description and drawings forming a part of this specification to which reference may now be had, not for purposes of limitation, but for a more complete understanding of the characteristic features of this invention in which drawings one modification is shown by Figs. 1 to 6, wherein:

Fig. 1 is a front view of the device in perspective, the cover plate being removed and parts broken away for clearness;

Fig. 2 is a vertical sectional view taken on the line II—II of Fig. 1;

Fig. 3 is a vertical sectional view taken on the line III—III of Fig. 2;

Fig. 4 is a perspective view of the actuator shaft;

Fig. 5 is an exploded view in perspective of the various elements that are assembled on the actuator shaft; and Fig. 6 is a horizontal sectional view taken on the line VI—VI of Fig. 1.

Another form of the invention is illustrated by Figs. 7 to 13, wherein:

Fig. 7 is a front elevational view of the instrument with the cover removed;

Fig. 8 is a side elevational view with the cover removed and a portion thereof shown in section;

Fig. 9 is a horizontal sectional view taken on the line IX—IX of Fig. 7;

Fig. 10 is a horizontal sectional view taken on the line X—X of Fig. 7;

Fig. 11 is an enlarged exploded perspective view of the temperature range adjusting spring assembly;

Fig. 12 is an enlarged sectional view of a portion of the temperature range adjusting spring assembly taken on the line XII—XII of Fig. 10; and Fig. 13 is a partial sectional view showing the cover securing means taken on the line XIII—XIII of Fig. 7.

A further modification of this invention is shown in Figs. 14 to 19, wherein:

Fig. 14 is a front elevational view of the device with the cover plate removed;

Fig. 15 is a vertical sectional view taken on the line XV—XV of Fig. 14;

Fig. 16 is a vertical sectional view taken substantially on the line XVI—XVI of Fig. 14;

Fig. 17 is a side elevational view looking from the left in Fig. 14;

Fig. 18 is an exploded perspective view of the pressure range adjusting spring assembly; and Fig. 19 is a vertical sectional view of the pressure range adjusting spring assembly taken substantially on the line XIX—XIX of Fig. 17.

The control device of this invention is of general utility and may be applied to operate many things, such as a valve, a make and break switch, or a resistance, and may be responsive to any type of condition, such as pressure or temperature. For purposes of description and illustration, however, the control mechanism is shown as applied to a variable resistance, preferably in the form of a potentiometer, and responsive to changes in any desired condition or force, such as temperature or pressure changes.

Referring now to Figs. 1 to 6 wherein one form of the invention is illustrated, the housing which encloses the control device is indicated generally at 10. Extending rearwardly from the housing 10 is a tubular extension 11 which is secured to the housing by a slot and tongue arrangement 12. Secured to the tubular extension 11 by means of a screw 14 is one end of a bimetallic coil 13. A torque rod 15 is secured to the other end of the bimetallic coil 13 by a screw 16. This torque rod extends through the coil 13 and extends into and terminates within the housing 10. This bimetallic coil is extended into a chamber, the temperature of the contents of which is to be the controlling factor. Temperature changes in this chamber are reflected by twisting or untwisting of the bimetallic coil 13 which rotates the torque rod 15 in direct proportion to the temperature changes. Specifically, an increase in temperature untwists the bimetallic element and rotates the rod 15 in a counter-clockwise direction as viewed in Figs. 1 and 3, and a decrease in temperature twists the bimetallic element and rotates the rod 15 in a clockwise direction. It is to be understood that this disclosure of a temperature responsive element is merely illustrative of one type of condition or force responsive device.

An actuator shaft is generally designated at 17, which shaft 17 is secured to the terminal end of the torque rod 15 by means of a set screw 18. The actuator shaft 17 consists of an enlarged shoulder 19, an intermediate shoulder 20, a small shoulder 21, an extension 22, a flattened surface 23 at the end of the extension 22, and a screw-threaded portion 24, as is clearly shown in Fig. 4. Loosely mounted on shoulder 20 of the actuator shaft 17 are a washer 25, a control lever 26, and a washer 27. 28 designates an insulating block which is riveted to a side lug 29 of the control lever 26, and a potentiometer slider member 30 is riveted to the insulating block 28. This slider 30 and control lever 26 are rotated by the actuator shaft 17 by means of a mechanism to be pointed out more specifically hereafter, so that if the torque rod 15 is oscillated due to changes in temperature through the above construction, the slider 30 is also oscillated.

31 is a resistance coil and is preferably shown to be a potentiometer coil which is arcuate in shape, the center of the arc of said coil being located substantially directly below the center of the actuator shaft 17. End lead wires 32 and 33 are soldered respectively to the left end and the right end of the coil 31. A middle lead wire 34 is soldered to the slider member 30 adjacent to the point where the slider member 30 is secured to the insulating block 28. These lead wires are flexible and insulated.

The operation of the potentiometer is simple and well-known in the art, and a detailed description is not considered necessary, it being sufficient to say that as the slider 30 moves gradually across the coil 31 the electrical resistance is varied. A basic point of this invention as applied to this modification, however, is to provide an adjustable control mechanism for the potentiometer which may be accomplished by the following structure:

The potentiometer coil 31 is secured to posts 37 and 38 which in turn are secured to spring supporting members 35 and 36, these supporting members 35 and 36 being made of spring material to urge the coil 31 forwardly into contact with the slider 30 so that a good contact is at all times maintained. On either end of the coil 31 are located insulating stops 39 and 40 to limit the movement of the slider 30. The arrangement is preferably such that when slider member 30 engages the stop 40, the slider member 30 is vertically disposed. 41 designates generally a slidable carrier member having upwardly extending legs 42 and 43 to which are riveted the spring supports 35 and 36. The slidable carrier 41 also has downwardly extending legs 44 and 45 which in turn have adjustment slots 46 and 47 therein. Screws 48 and 49 extend through the slots 46 and 47 and are threaded into the back wall of the casing 10 for the purpose of locking the sliding carrier 41 in any given number of desired positions. 50 and 51 are guides for the carrier 41 which are riveted to the casing 10 as shown in Fig. 6.

The above construction forms an adjustable potentiometer, the operation of which is as follows: Assuming that the carrier 41 is in the lower position as shown in Figs. 1 and 3, a given change in temperature acting on the bimetallic element 13 will oscillate the actuator shaft 17, and consequently slider 30, through a given angle. An increase in temperature acting on the bimetallic element 13 untwists the element and moves the slider from left to right; therefore, the left-hand stop 39 determines the lower limit and the right-hand stop 40 determines the upper limit of the range of temperature required to move the slider 30 gradually across the coil from one stop to the other. Assuming that the temperature change is sufficient, the slider will move from stop 39 to stop 40. By raising the carrier 41 the coil 31 will likewise be raised so that the distance between the coil 31 and the pivot of slider 30 will be decreased, whereby when the same amount of oscillation is given to the slider, the slider will not move from one stop 39 to the other stop 40. It is seen, therefore, that when the carrier 41, and consequently the coil 31, is raised to an upper position a further oscillation of the slider 30 is permitted, so that in order to effect a given travel of the slider 30 across the coil 31 a larger change in temperature is necessary. As stated above, the slider 30 is vertically arranged when it abuts stop 40, and when in this position upward and downward movement of the coil 31 does not vary the resistance. Since stop 40 determines the upper limit of the range of temperature and because of this vertical arrangement of the slider 30 when it abuts stop 40, the upper limit of the temperature range remains constant while the lower limit is varied to increase or decrease the range.

Conversely, if it should be desired to keep the lower limit of the temperature range constant and vary the upper limit, the slider 30 would be vertically arranged when it abuts stop 39, whereby upward and downward movement of the coil 31 would not vary the resistance. If it should be desired to maintain the middle point of the temperature range constant and vary both the upper and lower limits, the slider 30 would be vertically arranged when it is located at the center of the coil 31.

From the above it is seen that in this modification I have devised an instrument which gradually moves a slider across a coil and in which the temperature differential required so to move the slider may be increased or decreased and also in which the mid-point of the temperature range may be kept constant and the upper and lower limits varied, the lower limit of the temperature range may be kept constant and the upper limit varied or the upper limit of the temperature range may be kept constant and the lower limit varied, which latter operation is preferable in this type of instrument.

Because of the delicate nature of bimetallic coils, they are easily distorted by excessive loads placed thereon, and because of the positive stops that limit the movement of the slider 30 some means must be provided in the driving mechanism of the slider 30 to provide for over-travel of the actuator shaft 17 and torque rod 15 so that bending and breakage of the parts and distortion or even destruction of the bimetallic coil may be entirely eliminated. This may be accomplished by the following structure wherein 52 designates a driving lever loosely mounted on the shoulder 21. One end of a sleeve 53 is also loosely mounted on shoulder 21, and the other end of the sleeve 53 has a reduced portion with a flattened surface 54 to engage the flattened surface 23 of the actuator shaft 17 so that the sleeve 53 turns with the actuator shaft 17. 55 is a knurled nut which is screw-threaded on the screw-threaded extension 24 of the actuator shaft 17. By referring to Fig. 2, it will be seen that by tightening the nut 55 the driving lever 52 is securely clamped between the inner end of the sleeve 53 and the shoulder 20, so that the driving lever 52 is made to turn with the actuator shaft 17. The driving lever 52 has a downwardly extending arm 56 and a forwardly extending lug 57. Loosely mounted on sleeve 53 is a release lever 58, a washer 59, and another release lever 60. Levers 58 and 60 have downwardly extending arms 61 and 62 which engage the lug 57 of the driving lever 52 and forwardly extending lugs 63 and 64, respectively, which lugs are recessed as shown in Fig. 5 for the reception of the ends of a spring 66. A forwardly extending lug 65 of the control lever 26 projects just below the lug 57 of the driving lever 52 and between the arms 61 and 62 of the release levers 58 and 60. The coiled spring 66 is mounted on the sleeve 53 between a spacing flange 69 formed on the sleeve and the release lever 60. The spring 66 has downwardly extending ends 67 and 68 which engage respectively the recessed portions of the lugs 63 and 64 of the release levers 58 and 60. The purpose of this spring is to urge the release levers 58 and 60 centrally against the lugs 57 and 65.

The operation of this particular driving mechanism may be followed clearly when the parts are assumed as shown in Fig. 3. Arms 61 and 62 of the release levers 58 and 60 are urged centrally by the spring 66. Driving lever 52 is rigidly secured to the actuator shaft 17. Assuming that an increase in temperature causes the actuator shaft 17 to turn in a counter-clockwise direction, lug 57 of the driving lever 52 pushes arm 62 in a counter-clockwise direction. Spring 66 by means of spring end 67 makes arm 61 follow lug 57 so that arm 61 also moves in a counter-clockwise direction. Arm 61 pushes lug 65 and the control lever 26 in a counter-clockwise direction which moves slider 30 counter-clockwisely, or to the right, on the coil 31, as shown in Fig. 3.

From the above it will be seen that the drive of the slider 30 is in effect through a spring, the force or tension of which is sufficient to move the slider 30 along the coil but is not sufficient to strain or distort the bimetallic element 13. When a predetermined counter-clockwise movement has occurred, slider 30 will abut against stop 40 which will prevent further movement of the slider 30. Since the slider 30, the control lever 36 and the lug 65 thereon can move no further, further movement of the shaft 17, the driving lever 52, and the lug 57 thereon moves arm 61 only against the tension of spring 66. From this construction there is no binding, distortion, or danger of breakage of parts since the slider 30 is in effect driven through a spring pressed lost motion. Reverse or clockwise movement is just the opposite of the movement explained above, and a detailed description thereof is not considered necessary.

Another feature of this invention as applied to this modification is the provision of an adjustment between the torque rod 15 and the slider 30, so that the slider 30 may be angularly adjusted with respect to the torque rod 15. This adjustment is accomplished by the loosening of the knurled nut 55 which releases the driving lever 52 from between the clamping action of the inner end of the sleeve 53 and shoulder 20 of the actuator shaft 17. With the driving lever 52 so released, it can be rotated with respect to the actuator shaft 17, the driving lever also carrying along with it all of the other levers that are spring pressed to the lug 57. When the desired adjustment is obtained, the knurled nut 55 is tightened again to clamp the driving lever 52 between the inner end of the sleeve 53 and shoulder 20 of the actuator shaft 17.

In order to determine the amount of such adjustment, sleeve 53, which is rigid with the actuator shaft 17 because of the flattened surfaces 23 and 54, has a flange 70 in which are located screw-threaded holes. 72 is a disc having elongated slots 73, as shown in Fig. 1, through which extend screws 71 which are screw-threaded in the holes of the flange 70 to clamp the disc 72 securely to the flange 70. By this construction, disc 72 is in effect rigid with the actuator shaft 17. The disc 72 is suitably graduated in degrees of temperature. Driving lever 52 has a forwardly extending pointer arm 74 riveted thereto, which arm coacts with the dial graduations of the disc 72 to show the position of the driving lever 52 with respect to the shaft 17. This adjustment and visual indication thereof determine and show at which temperature the device will become operative to move the slider across the potentiometer. It determines and shows where the range of temperature becomes effective.

75 is a pointer arm which is secured to the rear wall of the housing 10 by the nut and screw arrangement 76. This pointer arm 75 also coacts with the dial graduations of the disc 72 to indicate the temperature acting upon the bimetallic element 13.

As noted above, disc 72 has elongated slots 73 therein so that by loosening the screws 73 disc 72 may be rotated and adjusted with respect to the flange 70 of the sleeve 53. This slot and screw arrangement provides an adjustment for the calibration of the instrument.

A pair of U-shaped brackets generally designated at 77 and 78 are riveted to the side walls of the housing 10. The arms 79 and 80 of the U-shaped brackets form supports for a terminal block which is not shown, the lead wires 32, 33, 34 being connected to the binding posts on this terminal block. The housing 10 is provided with an opening 81, as shown in Fig. 1, to accommodate an external conduit leading to the terminal block. The U-shaped brackets 77 and 78 also have arms 82 and 83 which are used for securing the cover plate, not shown, on the housing.

Referring now to Figs. 7 to 13 wherein another form of the invention is illustrated, 110 designates a base of insulating material such as bakelite upon which is mounted, by means of screws not shown, a supporting member 111 having outwardly extending flanges. One of the flanges forms the supporting means for a sealed bellows 112 which contains a suitable volatile fluid. A screw-theaded extension 113 on one end of the bellows 112 extends through a slot in the flange of the supporting member 111, and on either side of the flange of the supporting member 111 are heat insulating washers 114. A nut 115 screwed on the extension 113 of the bellows 112 clamps the bellows 112 to the supporting member 111 in a heat insulating manner. The other outwardly extending flange of the supporting member 111 has a knife edge 116 secured thereto by means of a screw 117.

118 designates a lever having a concavo-convex portion 119 which engages the knife edge 116. This lever 118 has a detent therein located just above the portion 119 to receive and engage the abutment 120 of the bellows. On the other side of the concavo-convex portion 119 of the lever 118 which engages the knife edge 116 is another concavo-convex portion 121 which is engaged by a knife edge 122.

This knife edge 122 is supported and held by means of a screw 123 which is screw-threaded into a grooved nut 124 upon which is secured a temperature adjusting spring 125. The other end of the spring 125 is secured to a grooved nut 126 in which an adjusting screw 128 is screw-threaded. 127 designates a guide which is rigidly secured to the grooved nut 126 to prevent turning of said nut by engaging a spring anchor member 129 which is secured to the bakelite base 110 by screws 129'. This anchor member has a laterally extending lug 130 through which the adjusting screw 128 extends, and a stop 131. Stop 131 and the lug 130 limit the movement of the nut 126 and guide 127.

Mounted on the other end of the lever 118 is a spring arm 132 which is clamped between the insulating pad 133 and the insulating washers 134 by means of screws 135 screw-threaded into the lever 118. Soldered to the outer end of the spring arm 132 is a slider contact 136 which is urged against the coil 137 by the spring arm 132. The resistance coil 137, which may be in the form of either a plain resistance or preferably a potentiometer, is wound around a post 138 with insulating material located between the post 138 and the coil windings of the coil 137, the post being secured to the anchor member 129 as at 139. Flexible and insulated lead wires 140 and 141 are soldered to the left and right ends, respectively, of the coil 137. These wires 140 and 141 are secured to binding posts 142 and 143, respectively, located on the bakelite base 110. Extending from and soldered to the spring arm 132 is an insulated and flexible middle lead wire 144 which is connected to a binding post 145 also located on the base 110.

The guide member 127 has a pointer 146 which coacts with a scale 147 which is secured to the spring anchor member 129 by means of screws 148. Movement of the arm 118 is limited by stops 149 located on the supporting member 111.

The theory of operation of the electrical resistance, or preferably the potentiometer, is the same as in the above modification and is old and well-known in the art, and a detailed description thereof is not considered necessary, it being sufficient to state that the resistance is varied by the slider contact 136 moving across the coil 137. The slider 136 is urged to the left by the bellows 112 because the point of actuation of the latter is located above the knife edge 116, and the slider 136 is urged to the right by the tension spring 125 because its point of actuation 122 is located below the knife edge 116.

The bellows 112 has a volatile fluid sealed therein which is selected according to the temperature at which the device is to operate. By using a volatile fluid which gradually vaporizes at or near the selected temperature, large movements are imparted to the arm 118 for minute changes in temperature which makes the instrument accurate and extremely sensitive to slight changes in temperature.

Spring 125 is made adjustable by the structure set out above so that the temperature at which the instrument becomes operative may be varied. The instrument is calibrated and made accurate by means of the adjustment screw 123 which is turned to place the required tension in the spring 125 for a given temperature. After proper calibration the screw head is sealed to prevent the instrument from getting out of adjustment. By rotating the screw 128 either more or less tension is placed in the spring 125 to determine at which temperature the bellows 112 will overcome the spring 125 to move the slider 136 gradually across the coil 137. The pointer 146 and the associated scale 147 give a visual indication at which temperature the instrument will become operative.

Assuming that the spring adjustment is set for a given temperature, say 70° F., as indicated in Fig. 7, and that the prevailing temperature acting on the bellows 112 is lower, the spring 125 will maintain the slider 136 to the right of the coil 137. When the prevailing temperature increases the volatile fluid contained within the bellows 112 will gradually vaporize to increase the pressure in the bellows, and when the prevailing temperature reaches say 69° F. the bellows pressure will balance the effort of the spring 125, and any further slight increase in temperature will cause the slider 136 to be placed in a new position slightly to the left. When the prevailing temperature reaches say 70° F. the bellows pressure will have increased sufficiently to move the slider to its mid-position on the coil as shown in Fig. 9, and when the prevailing temperature increases to say 71° F. the bellows pressure will have increased sufficiently to move the slider 136 to its extreme left position. For every increment of temperature change there is a corresponding increment of movement of the slider 136 along the coil 137. Reverse operation, that is, moving the slider 136 from the left to the right, is caused by a decrease in temperature which gradually decreases the pressure in the bellows 112 to allow the spring 125 to move the slider 136 gradually over the coil 137 from left to right. Like operation of the instrument will occur for various degrees of tension placed in the spring 125 by means of the temperature adjusting screw 128.

From the above it is seen that an instrument is provided in this modification, as well as in the previous modification, wherein a slider is gradually moved across a resistance in direct relation to the prevailing temperature changes; that the gradual movement of the slider is completed through a predetermined temperature range; and that the temperature at which the instrument becomes operative may be accurately adjusted.

A salient feature of this invention as applied to this modification, as well as in the previous modification, is the provision of means for accurately adjusting the range of temperature required to move the slider across the coil so that a greater or lesser differential of temperature is required to move the slider completely across the coil. This may be accomplished in this modification by the use of a temperature range adjusting spring assembly consisting of a temperature range adjusting spring 150, an adjusting screw 151, and a knurled adjusting nut 152, as clearly shown in Fig. 11.

The adjusting screw 151 has an integral collar 153, which abuts against a bracket support 156, and a screw-threaded extension 154 which extends through a hole in the bracket support 156. A nut 155 is screw-threaded on the screw-threaded extension 154 to clamp the collar 153 against the bracket support 156 to support the adjusting screw 151 on the base 110. The bracket support 156 is secured to the base 110 by means of screws 156'. One end of spring 150 is secured to a grooved abutment 157, and this abutment is provided with a projection 158 having a hole extended therethrough. A pin 159 extends through the hole in the projection 158 of the abutment 157 and is screw-threaded into the arm 160 as shown clearly in Fig. 10 to form a pivot for the temperature range adjusting spring assembly. The arm 160 is secured to the lever 118 by means of the screws 161.

The adjusting nut 152 has a transverse wall 162 in the form of a helix. This transverse wall 162 has a central opening 163 which engages and coacts with the threads of the screw 151, and it also has a slot 164 to receive the spring 150. By comparison, the transverse wall 162 somewhat resembles a split lock washer in structure. This assembly is so constructed that the pitch of the screw 151 is the same as the effective pitch of the spring 150 when it is neither compressed nor expanded so that by turning the adjusting nut 152 the spring is neither compressed nor expanded. The only change that occurs is that the effective length of the spring 150 is varied due to the position of the nut 152 whereby the spring rate is varied. The theory upon which this assembly is made is based on the principle that it takes more force to expand or contract a short spring a given distance than it does to expand a long spring the same distance. The purpose of this temperature range adjusting spring assembly is to place a greater load on the bellows 112 or on the spring 125 at a predetermined time so that it will require a greater bellows pressure or spring pressure to move the slider across the coil, consequently a greater temperature differential. Stated in another manner, the purpose of this temperature range adjusting spring assembly is to require a predeterminable effort on the part of the bellows or the spring to move the slider a given distance across the coil, consequently a predeterminable temperature differential. By adjusting the length of the spring, the spring rate is changed, and the load to be placed upon the bellows 112 or the spring 125 at this predetermined time may be varied to increase or decrease the temperature range necessary to move the slider from one extreme position to the other.

Assume that the slider 136 is in its center position; that the spring 150 is neutral, that is, neither tension nor compression being present, when the slider 136 is in the center position; that the range of temperature without the range adjusting spring assembly is say 69° to 71° as set out above; that the prevailing temperature is say 70°; and that the adjusting nut 152 is at the extreme right position to give the longest available spring length. As the temperature increases above 70° F., the pressure in the bellows 112 increases and begins to move the slider 136 to the left. As the slider 136 so begins to move it is resisted by the spring 150 which is placed in tension by this movement so that in order to move the slider to the extreme left a greater pressure in the bellows 112, and consequently a greater prevailing temperature, is required than if the spring 150 were not present. From this it is seen that the temperature rise necessary to move the slider 136 from its middle position to its left position must be greater. Assume that the temperature begins to fall below 70° F.; then the pressure within the bellows 112 will decrease and the spring 126 will begin to move the slider 136 from the middle position toward the right, but this movement will be resisted by the spring 150 which is placed in compression by this movement. From this it will be seen that the pressure within the bellows 112 and the prevailing temperature must be decreased a greater amount because of the resistance of the spring 150 to move the sliders from the mid-position to the right position.

From the above construction and operation it will be seen that by the use of the spring 150 the upper limit of the temperature range is raised and the lower limit lowered. By moving the adjusting nut 152 to the left so that the effective length of the spring 150 is shortened, the spring rate will be increased, and the spring will offer greater resistance to movement of the lever 118 in either direction which will tend still further to lower the lower limit and raise the upper limit. In all positions of the adjusting nut 152 it is noted that the mid-point of the range remains constant while the ends of the range are varied because the spring 150 remains neutral when the slider 136 is in its mid-position.

If it is desired to maintain the lower end of the range constant and vary the upper end of the range, the temperature range adjusting spring assembly must be assembled into the instrument in a different manner. Instead of placing the spring in the instrument so that it will be neutral when the slider 136 is in the mid-position as above, it is placed in neutral when the slider is in the extreme right position. This may be accomplished by rotating the adjusting screw 151 with respect to the spring 150 and the knurled nut 152. With such an assembly, resistance caused by the spring 150 becomes operative in the form of tension only against the bellows pressure 112 and not against the spring 125.

Conversely, in order to maintain the upper limit constant and vary the lower limit, the spring 150 is placed in neutral when the slider 136 is in the extreme left position so that the spring 150 causes resistance in the form of compression only to the movement of the spring 125 and not to the movement of the bellows 112.

From the above it is seen that in this modification, as well as in the preceding modification, I have devised an instrument which gradually moves a slider across a coil and in which the temperature differential required so to move the slider may be increased or decreased, and also in which the mid-point of the temperature range may be kept constant and the upper and lower limits varied, which is preferable in this type of instrument, the lower limit of the temperature range may be kept constant and the upper limit varied, or the upper limit of the temperature range may be kept constant and the lower limit varied.

A cover 165 for the coil 137 has a slot 166 through which the slider 136 extends and a slot 167 to accommodate the lead wires 140 and 141. This cover is held in place by means of a stud 169 that is screwed into the post 138 and locked in position by the nut 170. The nut 171 threaded on the stud 169 securely clamps the cover 165 in place. This cover 165 prevents dust from accumulating on the coil 37.

A cover for the entire instrument is designated at 172, and this cover supports a conventional thermometer 173. Mounted on the base 110 by means of screws 175 is a tongue 174 which is adapted to extend into a hole in one end of the cover 172 to form a hinge therefor. The other end of the cover, as shown in Fig. 11, is locked to the base 110 by means of spring arms 176 riveted to the cover and extending through a slot 177 in the base 110. The ends of these arms 176 are provided with bends 178 which coact with the shoulders 179 of the base 110 to secure the cover 172 to the base 110. Holes 180 are provided in the base 110 for the reception of a key 181, which key when inserted in the holes 180 pushes the arms 176 inwardly only sufficiently to release the bends 178 from the shoulders 179 to unlock and permit removal of the cover 172.

A further modification of the invention is shown in Figs. 14 to 19, in which the control mechanism is enclosed in a housing 210 which has secured thereto a pressure responsive bellows casing 211 by means of screws 212. The bellows casing 211 may contain a pressure responsive element of any known type, such as a bellows. The pressure is conducted to the casing 211 to act upon the bellows therein from any source by means of a pipe connection 213.

Secured to the back wall of the housing 210 by means of screws 215 is a knife edge supporting member 214. Extending forwardly from the knife edge supporting member 214 is a flange 216 having downwardly extending knife edges 217. These knife edges engage concavo-convex portions 218 on a lever 219 to form a fulcrum for said lever. The lever 219 has upstanding arms 220 which overlie lugs 221 located on the flange 216 to maintain the lever 219 in assembled relation with the supporting member 214.

On the lower right-hand portion of the lever 219 is riveted a concave plug 222 which receives and engages the bellows plunger 223. Punched out of the lever 219 is an arm 224 having a hole therein through which the lower end of a temperature adjusting spring 225 is extended. The upper end of the temperature adjusting spring 225 is secured to a grooved collar 226, which collar is screw-threaded to receive an adjusting screw 227 which extends upwardly through the top of the housing 210, the head of which screw abuts the housing. By turning the adjusting screw 227 the tension in the spring 225 is increased or decreased. Secured to the grooved collar 226 is a pointer arm 228 which extends outwardly through a slot 229 in the side wall of the casing 210 to give an exterior visual indication of the amount of tension present in the spring 225.

Secured to the lever 219 by means of screws 231 is a first slider arm 230 which has riveted thereto by means of a rivet 234 second and third slider arms 232 and 233, respectively. Secured to the slider arms 230, 232, and 233 are spring arms 235, 236, and 237, respectively, which spring arms are insulated from the slider arms by means of insulating pads 239 and insulating washers 240 and secured in place by means of the screws 238. Soldered to each of the spring arms 235, 236, and 237 are sliders 241, 242, and 243, respectively, which sliders engage and coact with resistance coils 248, 249, and 250, respectively. The coils 248, 249, and 250 are wound about and insulated from posts secured to a coil supporting member 245. Spring arms 235, 236, and 237 press the sliders 241, 242, and 243 against their respective coils 248, 249, and 250. This coil supporting member 245 is fastened to the back wall of the housing 210 by means of screws 246 and is made adjustable by reason of the screws 246 being located in slots 247 in the coil supporting member 245 to allow endwise movement of the supporting member 245. Soldered to the right ends of the coils as shown in Fig. 14 are end lead wires 251, and soldered to the left ends of the coils are end lead wires 252. Middle lead wires 253 are soldered to projections on the insulating spring arms 235, 236, and 237.

A terminal block 254 is fastened to the side walls of the housing 210 by means of screws 255. The terminal block contains a first set of binding posts 256, 257, and 258 which are electrically connected by the lead wires 251, 252, and 253 to the left end of the coil 248, the right end of the coil 248, and the spring arm 235, respectively, and a second set of binding posts 259, 260, and 261 which are electrically connected by means of other lead wires 251, 252, and 253 to the left end and the right end of the coil 249 and the spring arm 236, respectively. Located on top of the housing and insulated therefrom are binding posts 262, 263, and 264 which are electrically connected by means of further lead wires 251, 252, and 253 to the left end and the right end of the coil 250 and the spring arm 237, respectively.

Riveted to the housing 210 is a stop member comprising an upper stop 265 and a lower stop 266. The spring 225 is made adjustable by the structure set out above so that the pressure at which the instrument becomes operative may be varied. By turning the screw 227 more or less tension is placed in the spring 225 to determine at which pressure the bellows contained in the bellows casing 211 will overcome the spring 225 to move the sliders gradually across the coils. Pointer 228 gives a visual indication at which pressure the instrument will become operative.

The operation of this modification is similar to the operation of the immediately preceding modification so that a detailed description thereof is not considered necessary, it being sufficient to say that an increase in pressure causes the bellows to move the sliders from right to left and that a decrease in pressure allows the spring 225 to move the sliders from left to right. Movement of the sliders in this modification as shown in each of the preceding modifications will be gradual, and a complete movement will occur through a given pressure range.

From the above it is seen that in this modification, as well as in the others, an instrument is provided wherein sliders are gradually moved across resistances in direct relation to the prevailing pressure changes; that the gradual movement of the sliders is completed through a predetermined pressure range; and that the pressure at which the instrument becomes operative may be accurately adjusted by means of the adjusting screw 227.

Again in this modification, as in the previous modifications, an important feature of the invention is the provision of means for accurately adjusting the range of pressure required to move the sliders across the coil so that a greater or lesser differential of pressure is required to move the sliders completely across the coils. This may be accomplished by means of a pressure range adjusting spring assembly similar to the temperature range adjusting spring assembly of Figs. 7 to 13 consisting of a pressure range adjusting spring 267, an adjusting screw 268, and a knurled adjusting nut 269, as clearly shown in Fig. 18.

The adjusting spring 267 is secured to a grooved collar 270 which collar has a projection 271 with a hole therein. The lever 219 has a slot therein to receive the projection 271 of the grooved collar 270 and a hole to receive the pin 272 which projects through the hole in the projection 271 to pivot the grooved collar to the lever 219. Integral with the range adjusting screw 268 is a collar 273 having shoulders 274 which project through a hole in the upper wall of the housing 210. The range adjusting screw 268 is clamped in place and secured against rotation in the upper wall of the housing 210 by means of a nut 276 which is screw-threaded on the screw-threaded extension 275 integral with the screw 268.

The knurled nut 269 of this modification has a transverse wall 277 in the form of a helix, as in the previous modification. This transverse wall 277 has a central opening 278 which engages and coacts with the screw 268, and it also has a slot 279 to receive the range adjusting spring 267. Here also this assembly is so constructed that the pitch of the screw 268 is the same as the effective pitch of the range adjusting spring 267 so that by turning the adjusting nut 269 the spring is neither compressed nor expanded, but the length of the spring, and consequently the spring rate, is varied. The theory and operation of this structure is identical with that of the previous modification, and a further detailed description, therefore, is not considered necessary.

Briefly, the mode of operation is as follows: assume that the spring 225 is so tensioned as to require a pressure of say 80 pounds exerted on the bellows to begin to overcome the spring pressure to begin the movement of the sliders to the left; that the range of pressure required for this movement without the range adjusting spring assembly is say 80 to 82 pounds; that the sliders are in their extreme right-hand positions; that the spring 267 is neutral, that is, neither tension nor compression being present, when the sliders are in the extreme right-hand positions; and that the adjusting nut 269 is in the extreme upper position to give the longest available spring length. When the prevailing pressure acting on the bellows increases to 80 pounds, the sliders will begin to move to the left. As the sliders so begin to move they are resisted by the tension in the spring 267 so that in order to move the sliders to their extreme left positions a greater pressure in the bellows is required than if the spring 267 were not present. From this it is seen that the pressure increase necessary to move the sliders from the right-hand positions to the left-hand positions must be greater.

By moving the adjusting nut 269 downwardly so that the effective length of the spring 267 is shortened, the spring 267 will offer greater resistance to movement of the lever 219 which will tend still further to raise the upper limit of the range. In all positions of the adjusting nut 269 it is noted that the bottom limit of the range remains constant and that the upper limit is varied due to the fact that the spring 267 is neutral when the sliders are in the extreme right positions.

In this modification, as in the immediately preceding one, if it be desired to maintain the upper limit of the range constant and vary the lower limit of the range, the spring 267 is placed in neutral when the sliders are in the extreme left positions so that the spring 267 causes resistance in the form of compression only to the movement of the spring 225 and not to the movement of the bellows.

If it be desired to maintain the mid-point of the range constant and vary the upper and lower ends of the range, the range adjusting spring is made neutral when the sliders are in their mid-positions so that movement of the sliders from the mid-position to the right will be resisted by compression in the spring 267, and movement of the sliders from the mid-position to the left will be resisted by tension in the spring 267.

From the above it is seen that I have in this modification, as in both of the previous modifications, devised an instrument which gradually moves sliders across coils, and in which the differential in the controlling condition required so to move the sliders may be increased or decreased, and also in which the mid-point of the range may be kept constant while the upper and lower limits are varied, the lower limit of the range may be kept constant while the upper limit is varied, which is preferable in this type of instrument, or the upper limit of the range may be kept constant while the lower limit is varied.

Loosely mounted in a groove in the knurled nut 269 is a ring 280 to which is secured a pointer 281 which extends outwardly through a slot 282 in the side wall of the housing 210 to give an exterior visual indication of the pressure range required to move the sliders gradually across the coil. A plate 283 is secured to the outer side of the housing 210 by means of the screws 284, which plate is graduated to coact with the pointers 228 and 281 to give the proper visual indications of the conditions existing in the springs 225 and 267 in terms of pressure. This scale plate 283 is made adjustable by means of slots 285 located therein which coact with the securing screws 284. The cover plate (not shown) is secured to the housing 210 by means of screws extending into holes 286 in the side walls of the housing 210.

While several embodiments of this invention have been shown and described, it is obvious that many modifications may be apparent to one skilled in the art. For example, the levers of these modifications may be used to operate valves, make and break switches, and other devices, while pressure and temperature responsive devices or any other condition or force responsive devices may be used interchangeably on the various modifications. Consequently, this invention is to be limited only by the scope of the appended claims.

I claim:

1. In a control mechanism of the character described, an element, a control arm movable with respect to said element to complete said control, means to move said arm according to changes in a condition affecting said means, said arm being moved a predetermined distance with respect to said element by a predetermined range of changes in the condition, means to make said means responsive to selected conditions, and means to increase or decrease said range of changes in the condition required to move said arm said predetermined distance with respect to said element by spreading the increase or decrease proportionately throughout said range.

2. In a mechanism of the character described, a control device including an element and a member movable with respect thereto, means to move said member according to changes in temperature affecting said means, said member being moved a predetermined distance with respect to said element by a predetermined range of changes in the temperature, and means to increase or decrease said range of changes in the temperature required to move said member said predetermined distance with respect to said element by spreading the increase or decrease proportionately throughout said range.

3. In a control mechanism of the character described, an element, an arm movable with respect to said element to complete said control, means affected by a range of changes in a condition operable to move said arm gradually through a predetermined distance with respect to said element and in direct proportion to said range of changes in the condition affecting said means, means to make said means responsive to selected conditions, and means operative to increase or decrease said range of changes in the condition by increasing or decreasing each increment thereof necessary to move said arm gradually through said predetermined distance with respect to said element.

4. In a control mechanism of the class described, an element, a control arm movable with respect to said element to complete said control, means to move said arm a given distance with respect to said element in proportion to changes in a condition occurring through a given range affecting said means, means to make said means responsive to selected conditions, and means to increase or decrease said range of changes in the condition required to gradually move said arm said given distance with respect to said element by proportionately increasing or decreasing each portion of said range.

5. In combination, a control means, a condition responsive means associated therewith to operate the same through a predetermined gradual control action in response to a given range of change in said condition, means to make said means responsive to selected conditions, and adjustable means associated with said control means and condition responsive means operable to increase or decrease the range of change in said condition required to operate said control means through said predetermined control action.

6. In an instrument having a variable resistance, means responsive to changes in a condition occurring through a given range of changes in the condition to gradually vary said resistance a predetermined amount according to changes in the condition in said range, means to make said means responsive to selected conditions, and means to increase or decrease the range of changes in the condition necessary to gradually vary said resistance said predetermined amount.

7. In an instrument, a resistance element, a contact engaging said element, means operable gradually to move said contact a given distance along said element in direct relation to changes in a range of a condition affecting said means, means to make said means responsive to selected conditions, and means operable to require a greater or lesser range of changes in the condition gradually to move said contact said given distance along said element.

8. In an instrument, a resistance element, a contact engaging said element, movable means operable gradually to move said contact a given distance along said element according to a predetermined movement of said movable means, and means cooperating with said movable means to require greater or lesser movement of said movable means gradually to move said contact said given distance along said element.

9. In a device of the character described, an element, a member movable with respect to said element, movable means operable to proportionately move said member a given distance with respect to said element according to a predetermined movement of said movable means, and means cooperating with said movable means to require a greater or lesser movement of said movable means to move said member said given distance with respect to said element.

10. In a device of the character described, a resistance element, a pivoted contact engaging said element, means operable to oscillate said contact a given angle to move said contact a given distance along said element, and means to decrease or increase the distance between said element and the pivot of said contact to require a greater or lesser oscillation of said contact to move said contact said given distance along said element.

11. In a device of the character described, a resistance element, a pivoted contact engaging said element, means operable to oscillate said contact a given angle to move said contact a given distance along said element, and means to move said element with respect to the pivot of said contact to require a greater or less oscillation of said contact to move said contact said given distance along said element.

12. In a device of the character described, a resistance element, a pivoted contact engaging said element, means responsive to a predetermined range of changes in a condition to move said contact a given distance along said element, and means to increase or decrease the distance between said element and the pivot of said contact to require a greater or lesser range of changes in the condition to move said contact said given distance along said contact.

13. In an instrument of the character described, a condition responsive element, a member operated thereby, a resilient driving connection between said element and said member including a driving lever connected to said condition responsive element, spring pressed release levers engaging said driving lever and driven thereby, and a control lever connected to said member and engaging said release levers and driven by said release levers, whereby when said member and control lever are stopped, further movement of said condition responsive element and said driving lever is permitted.

14. In a device of the character described, an element movable in response to changes in a condition, an actuator member, means for adjusting adjustment of said actuator member relative to said condition responsive element and for securing said actuator member to said condition responsive element for movement thereby, and indicating means associated with said actuator member and said means whereby the amount of adjustment of said actuator with respect to said condition responsive element is visually indicated.

15. In a device of the character described, an element movable in response to changes in a condition, an actuator member, means for adjusting adjustment of said actuator member relative to said condition responsive element and for securing said actuator member to said condition responsive element for movement thereby, indicating means associated with said actuator member and said means whereby the amount of adjustment of said actuator with respect to said condition responsive element is visually indicated, and second indicating means associated with said other indicating means whereby the value of the condition affecting the movable element is visually indicated.

16. In combination with a variable resistance, a mechanism responsive to changes in a range of temperature to progressively vary said resistance a predetermined amount in proportion to the changes in temperature in said range, and adjustable means to make said mechanism responsive to an increased or decreased range of temperature to progressively vary said resistance said predetermined amount.

17. In an electric current controlling device, a resistance element, a pivoted contact engaging said element, means movable through a predetermined range of movement to oscillate said contact a given distance along said element, and means to decrease or increase the distance between said element and the pivot of said contact to decrease or increase the range of movement of said means required to move said contact said given distance along said element, the arrangement being such that one end of said range of movement of said means is maintained constant.

18. In an electric current controlling device, a resistance element, a pivoted contact engaging said element, means movable through a predetermined range of movement to oscillate said contact a given distance along said element, and means to decrease or increase the distance between said element and the pivot of said contact to decrease or increase the range of movement of said means required to move said contact said given distance along said element, the arrangement being such that both ends of the range of movement of said means are varied.

19. In a control mechanism of the character described, an element, a control arm movable with respect to said element to complete said control, means to move said arm according to changes in a condition affecting said means, said arm being moved a predetermined distance with respect to said element by a predetermined range of changes in the condition, means to make said means responsive to selected conditions, and means to increase or decrease said range of changes in the condition required to move said arm said predetermined distance with respect to said element by spreading the increase or decrease proportionately throughout said range, the arrangement being such that one end of said range of changes in the condition is maintained constant.

20. In combination, a control means, a condition responsive means associated therewith to operate the same through a predetermined gradual control action in response to a given range of change in said condition, means to make said means responsive to selected conditions, and adjustable means associated with said control means and condition responsive means operable to increase or decrease the range of change in said condition required to operate said control means through said predetermined control action, the arrangement being such that both ends of said range of changes in the condition are varied.

21. In a device of the character described, an element, a member movable with respect to said element, movable means operable to move said member a given distance with respect to said element in proportion to changes in a predetermined range of condition affecting said movable means, and means affording resistance to the movement of said movable means throughout its movement in said given distance, whereby each increment of said range of condition required to move said member said given distance is proportionately increased.

22. In a device of the character described having a control arm, means to gradually move said arm a given distance in proportion to changes in a condition occurring through a given range affecting said means, and adjustable means affording resistance to the movement of said arm to increase or decrease said range required to move said arm said given distance by proportionately increasing or decreasing each portion of said range.

23. In a control mechanism of the character described, a pressure device movable in response to changes in pressure acting thereon, a main spring for opposing movement of said pressure device whereby said pressure device is moved a given distance by a predetermined range of changes in pressure, and an adjustable range spring associated with said pressure device to increase or decrease the range of changes in pressure required to move said pressure device said given distance by spreading the increase or decrease proportionately throughout said range.

24. In a device of the character described having a control arm, means to move said arm according to changes in a condition affecting said means, said arm being moved a predetermined distance by a predetermined range of conditions and adjustable spring means offering resistance to the movement of said arm to increase or decrease said range required to move said arm said predetermined distance by spreading the increase or decrease proportionately throughout the range.

25. In a device of the character described having a control arm, means to move said arm a given distance in proportion to changes in a condition occurring through a given range affecting said means, and a range adjusting spring assembly comprising a spring secured to said arm, a stationary screw and a nut coacting with said screw and said spring to increase or decrease the effective length of said spring to increase or decrease said range required to move said arm said given distance.

26. In a device of the character described having a control arm, means to move said arm according to changes in a condition affecting said means, said arm being moved a predetermined distance by a predetermined range of condition, and a range adjusting spring assembly comprising a spring offering resistance to the movement of said arm and means to increase or decrease the spring rate of said spring to increase or decrease said range required to move said arm said predetermined distance.

27. In combination with a variable resistance, a mechanism responsive to changes in a range of pressure to progressively vary said resistance a predetermined amount in proportion to the changes in pressure in said range, adjustable means to make said mechanism responsive to a selected pressure, and adjustable means to make said mechanism responsive to an increased or decreased range of pressure to progressively vary said resistance said predetermined amount.

28. In a device of the character described having a control arm, means to gradually move said arm a given distance in proportion to changes in a condition occurring through a given range affecting said means, adjustable means requiring a given condition to move said arm, and adjustable means affording resistance to the movement of said arm to increase or decrease said range required to move said arm said given distance by proportionately increasing or decreasing each portion of said range.

29. In a device of the character described having a control arm, means to move said arm according to changes in a condition affecting said means, said arm being moved a predetermined distance by a predetermined range of condition, adjustable means requiring a selected condition to move said arm, and adjustable spring means offering resistance to the movement of said arm to increase or decrease said range required to move said arm said predetermined distance by spreading the increase or decrease proportionately throughout the range.

30. In a control mechanism of the character described, an element, an arm movable with respect to said element to complete said control, means affected by a range of changes in a condition operable to move said arm gradually through a predetermined distance with respect to said element and in direct proportion to said range of changes in the condition affecting said means, and means operative to increase or decrease said range of changes in the condition by increasing or decreasing each increment thereof necessary to move said arm gradually through said predetermined distance with respect to said element, said last mentioned means including adjusting means for maintaining any point of the range of change constant while the range of change is being increased or decreased.

LEWIS L. CUNNINGHAM.

CERTIFICATE OF CORRECTION.

Patent No. 2,041,050. May 19, 1936.

LEWIS L. CUNNINGHAM.

It is hereby certified that error appears in the printed specification of the above numbered patent requiring correction as follows: Page 9, first column, lines 30 and 41, claims 14 and 15 respectively, strike out the words "adjustment of"; and that the said Letters Patent should be read with these corrections therein that the same may conform to the record of the case in the Patent Office.

Signed and sealed this 1st day of September, A. D. 1936.

(Seal)

Leslie Frazer
Acting Commissioner of Patents.